United States Patent [19]

Kakuta

[11] Patent Number: 5,745,789
[45] Date of Patent: Apr. 28, 1998

[54] DISC SYSTEM FOR HOLDING DATA IN A FORM OF A PLURALITY OF DATA BLOCKS DISPERSED IN A PLURALITY OF DISC UNITS CONNECTED BY A COMMON DATA BUS

[75] Inventor: Hitoshi Kakuta, Kokubunji, Japan

[73] Assignee: Hitachi, Ltd., Tokyo, Japan

[21] Appl. No.: 5,822

[22] Filed: Jan. 19, 1993

[30] Foreign Application Priority Data

Jan. 23, 1992 [JP] Japan ................................. 4-010367

[51] Int. Cl.$^6$ ........................................ G06F 13/12
[52] U.S. Cl. ................. 395/841; 395/826; 395/872; 711/112
[58] Field of Search .................. 371/10.1, 11.1; 395/275, 600, 425, 404, 441, 826, 840, 841, 872; 711/4, 111, 112

[56] References Cited

U.S. PATENT DOCUMENTS

| | | | |
|---|---|---|---|
| 5,127,088 | 6/1992 | Takaki | 395/275 |
| 5,148,432 | 9/1992 | Gordon et al. | 371/10.1 |
| 5,155,835 | 10/1992 | Belsan | 395/439 |
| 5,206,943 | 4/1993 | Callison et al. | 395/425 |
| 5,257,367 | 10/1993 | Goodlander et al. | 395/600 |
| 5,285,451 | 2/1994 | Henson et al. | 371/11.1 |
| 5,301,297 | 4/1994 | Menon et al. | 371/10.1 |

OTHER PUBLICATIONS

A Case for Redundant Arrays of Inexpensive Disks (RAID), in ACM SIGMOD Conference, Jun. 1988, D. Patterson et al, pp. 109–116.

Weikum et al "Tuning of Striping Units in Disk–Array–Based File Systems" Jul. 1992.

Katz et al "Disk System Architecture for High Performance Computing" Dec. 1989.

*Primary Examiner*—Thomas C. Lee
*Assistant Examiner*—D. Dinh
*Attorney, Agent, or Firm*—Fay, Sharpe, Beall, Fagan, Minnich & McKee

[57] ABSTRACT

A disc controller divides write data supplied from a CPU into a plurality of data blocks and enables a common bus to be used for one disc unit and sends one of the data blocks obtained by the division. When the data block is received into a buffer 7 in the disc unit, the disc controller immediately enables the common bus to be used for another disc unit and sends the next data block and repeats the above operations, thereby dispersing and writing the write data to the disc units.

16 Claims, 11 Drawing Sheets

20 ADDRESS TRANSLATION TABLE

20a MAIN TABLE

| LOGICAL VOLUME NO. | LOGICAL ADDRESS | ADDRESS POINTER | |
|---|---|---|---|
| | | REAL VOLUME NO. | SUB-LOGICAL ADDRESS |
| LVOL#1 | LADL#1 | PVOL#1 | PADL1.1 |
| | | PVOL#2 | PADL1.2 |
| | | PVOL#1 | PADL1.3 |
| | | PVOL#2 | PADL1.4 |
| | LADL#5 | PVOL#1 | PADL5.1 |
| | | PVOL#2 | PADL5.2 |
| | | PVOL#1 | PADL5.3 |
| | | PVOL#2 | PADL5.4 |
| ---- | ---- | ---- | ---- |

20b SUBTABLE

| REAL VOLUME NO. | SUB-LOGICAL ADDRESS | ADDRESS IN DRIVE | ADDRESS IN CACHE |
|---|---|---|---|
| PVOL#1 | PADL1.1 | DADR1 | CADR1.1 |
| | PADL1.3 | DADR5 | — |
| | PADL5.1 | DADR3 | CADR5.1 |
| | PADL5.3 | DADR8 | — |
| | ---- | ---- | ---- |
| PVOL#2 | PADL1.2 | DADR3 | CADR1.2 |
| | PADL1.4 | DADR7 | CADR1.4 |
| | PADL5.2 | DADR4 | CADR5.2 |
| | PADL5.4 | DADR2 | CADR5.4 |
| | ---- | ---- | ---- |

DISC SYSTEM FOR HOLDING DATA IN A FORM OF A PLURALITY OF DATA BLOCKS DISPERSED IN A PLURALITY OF DISC UNITS CONNECTED BY A COMMON DATA BUS

BACKGROUND OF THE INVENTION

The present invention relates to a disc subsystem having a plurality of disc units.

Figure 11:
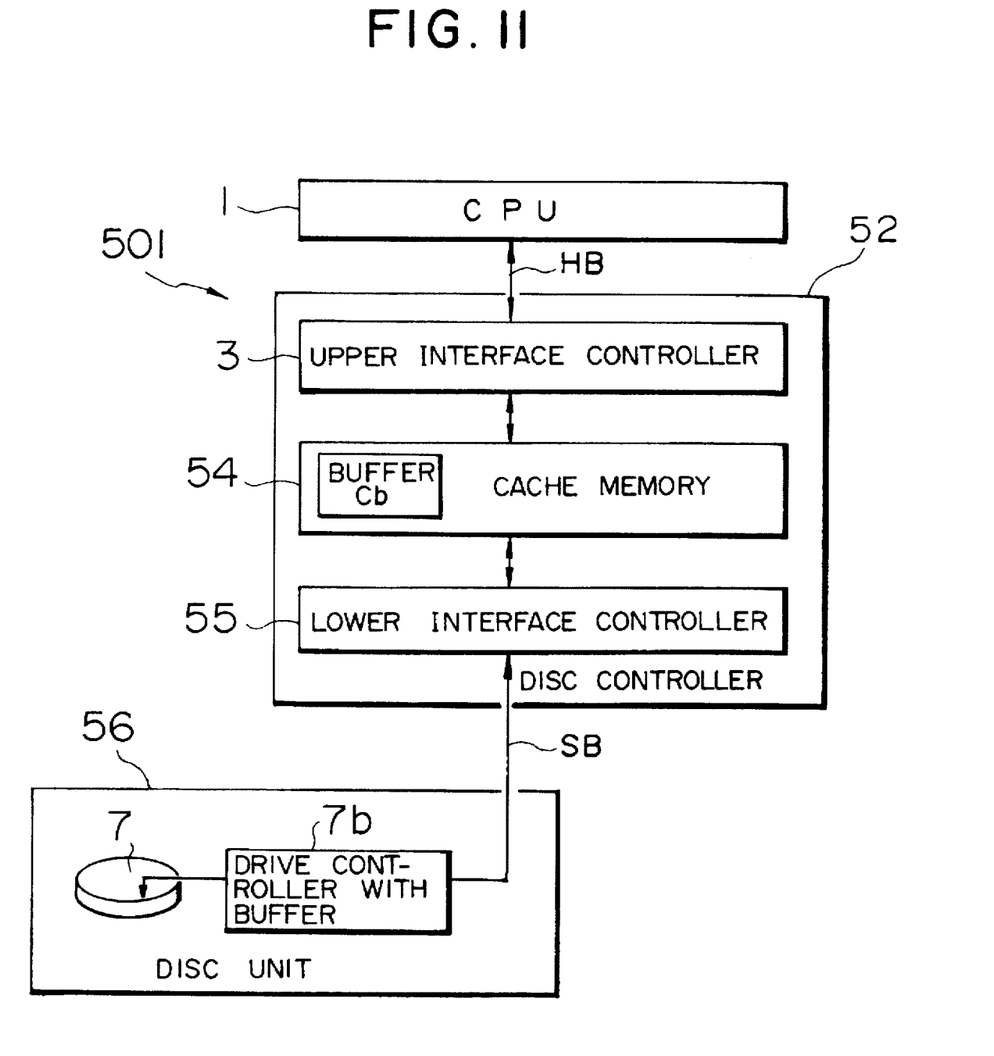
FIG. 11 is a whole constructional diagram of conventional disc subsystem.

FIG. 11 is a constructional diagram showing an example of a conventional disc subsystem.

A disc subsystem 501 includes a disc controller 52 and one disc unit 56 and is connected to a central processing unit (CPU) 1.

The disc unit 56 has one physical drive 7.

The writing operation will now be described as an example.

The CPU 1 sends write data to the disc controller 52 through a host bus HB. Data which is sent from the disc controller 52 to the physical drive 7 in the disc unit 56 is processed by a processing method in an SCSI interface.

When data is read out, the above process is reversely repeated and read data is sent from the disc unit 56 to the CPU 1.

Figure 12:
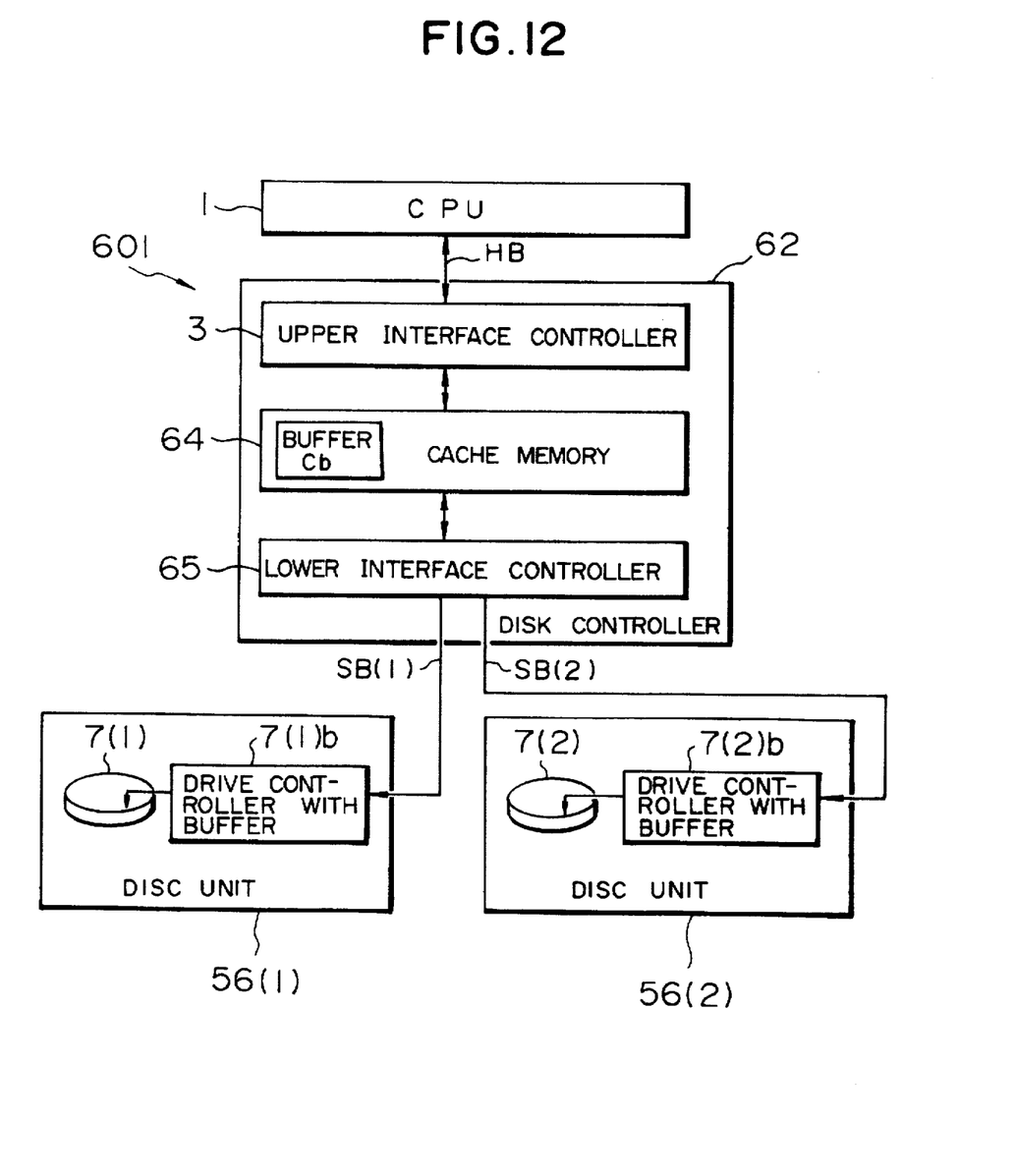
FIG. 12 is a whole constructional diagram of another conventional disc subsystem.

According to the disc subsystem 501, data is written/read out many times on a unit basis of a capacity of a local buffer 7b which the physical drive 7 has, so that it takes a very long time. Heretofore, a disc subsystem 601 as shown in FIG. 12 has been proposed. In D. Patterson, G. Gibson, and R. H. Kartz, "A Case for Redundant Arrays of Inexpensive Disks (RAID)", in ACM SIGMOD Conference, Chicago, Ill., June, 1988, with regard to a disc array (Level 3) for dividing data and processing the divided data in parallel and a disc array (Level 5) for dispersing data and independently handling the dispersed data, the results of the examinations of the performance and reliability are reported.

The disc subsystem 601 has a disc array construction and includes a disc controller 62 and two disc units 56(1) and 56(2) and is connected to the CPU 1.

The disc units 56(1) and 56(2) are connected in parallel with the disc controller 62 through an SCSI bus SB. The disc unit 56(1) has one physical drive 7(1). The disc unit 56(2) has one physical drive 7(2).

The CPU 1 sends write data to the disc controller 62 through the host bus HB.

The disc controller 62 preserves the received write data into a buffer $C_b$. The data in the buffer $C_b$ is divided into capacities of local buffers 7(1)b and 7(2)b. The divided data of the capacity of the local buffer 7(1)b is sent to the disc unit 56(1). The divided data of the capacity of the local buffer 7(2)b is sent to the disc device 56(2). Processes to send the data to each of the disc units 56(1) and 56(2) are similar to those in the disc subsystem 501 in FIG. 11.

When data is read out, the processes are reversely executed. That is, the data is read out from each of the disc units 56(1) and 56(2) and the read-out data is coupled by the disc controller 17 and sent as read data to the CPU 1.

In the disc subsystem 601, the data is divided into a plurality of data blocks each having a size of the capacity of the local buffer 7(1)b or 7(2)b and is written/read out into/from the disc units 56(1) and 56(2) in parallel. The processing speed is, therefore, ½ of the processing time of the disc subsystem 501 in FIG. 11.

SUMMARY OF THE INVENTION

Although the disc subsystem 501 in FIG. 11 has a simple construction, as mentioned above, when an amount of data to be processed is large, the data is divided into a plurality of data blocks each having the size of the local buffer 7b and the divided data blocks are sequentially processed. There is, consequently, a problem in that it takes a long time to write/read out the data.

On the other hand, according to the disc subsystem 601 of FIG. 12, although the time to write/read out the data is short, there is a problem such that the SCSI buses SB of the number as many as only the number of parallel disc units are necessary and the construction is complicated.

It is, therefore, an object of the present invention to provide a disc subsystem in which construction is relatively simple and a time to write/read out data is relatively short.

According to the present invention, there is provided a first disc subsystem, wherein a plurality of disc units are connected to a disc controller by one common bus, a plurality of data blocks are obtained by dividing write data supplied from an external apparatus, the disc controller has a unit for sequentially sending the plurality of data blocks to the plurality of disc units by using the common bus, and each of the disc units includes a buffer to hold the data block sent there; a physical drive; and a unit for writing the data block held into the physical drive in parallel and the data block next to the data block held is transferred to another disc unit through the common bus.

According to the present invention, there is also provided a second disc subsystem, in which a plurality of disc units are classified into a plurality of groups, the disc units of each group are connected to the disc controller by one common bus, and the disc controller executes the data transfer in parallel for each group.

DESCRIPTION OF THE PREFERRED EMBODIMENTS

The present invention will be described further in detail hereinbelow with respect to embodiments shown in the diagrams. The present invention is not limited by those embodiments.

First embodiment

Figure 1:
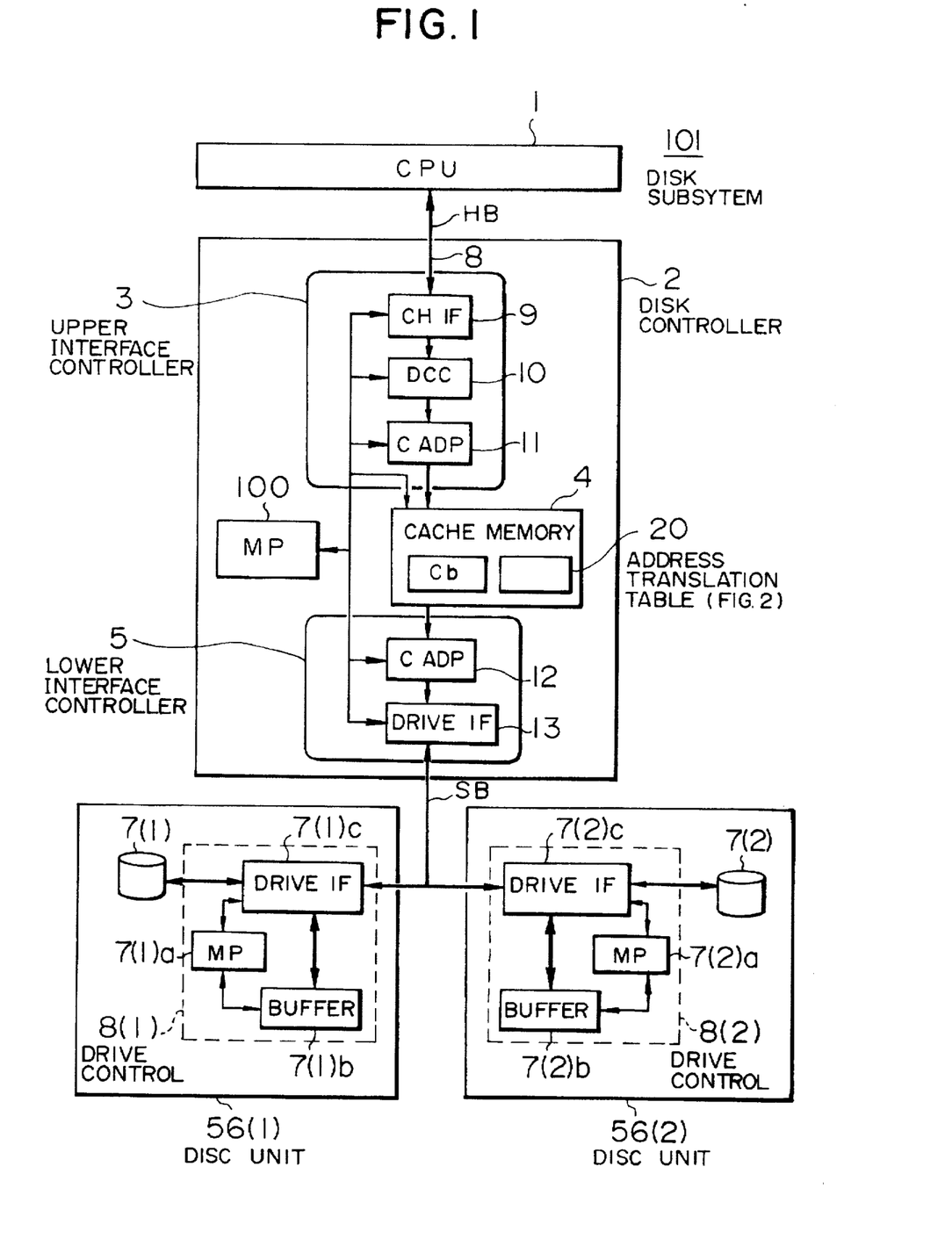
FIG. 1 is a whole constructional diagram of a disc subsystem according to the first embodiment of the present invention.

FIG. 1 is a whole constructional diagram of a disc subsystem 101 according to the first embodiment of the present invention.

The disc subsystem 101 comprises a disc controller 2 and the two disc units 56(1) and 56(2) and is connected to the CPU 1.

The disc controller 2 has therein: an upper interface controller 3; a microprocessor Mp and a cache memory 4 to control the whole system; and a lower interface controller 5.

A channel interface circuit (CH IF) 9 in the upper interface controller 3 controls the interface of a channel path 8 between the CPU 1 and the disc controller 2. A data control circuit (DCC) 10 controls the data transfer in the disc controller 2. A cache adapter circuit (C Adp) 11 on the channel side controls the transmission and reception of data between the cache memory 4 and the CPU 1.

The cache memory 4 comprises a control circuit (not shown) to manage data in the buffer $C_b$ to temporarily store data and in the cache memory 4. A table 20 (FIG. 2) for address translation is stored in a proper area in the buffer $C_b$.

The lower interface controller 5 comprises: a cache adapter circuit (C Adp) 12 on the disc unit side; and disc drive interface circuit (Drive IF) 13 to control the interface of the SCSI bus SB between the disc controller 2 and the disc units 56(1) and 56(2).

The disc units 56(1) and 56(2) are connected to the disc controller 2 by one SCSI bus SB. In the embodiment, the disc unit 56(1) has one physical drive 7(1) and one drive control 8(2). The disc unit 56(2) has one physical drive 7(2) and one drive control 8(2).

The drive control 8(1) comprises the buffer 7(1)b, a drive interface 7(1)c, and a microprocessor 7(1)a to control them. The drive control 8(2) comprises the buffer 7(2)b, a drive interface 7(2)c, and a microprocessor 7(2)a to control them. The embodiment is characterized in that the SCSI bus SB is time-sharingly switched and used.

A procedure for data writing processes will now be described. The processing procedure is fundamentally based on the processing procedure of SCSI mentioned above. The processing method in the SCSI interface has been described in detail in "Small Computer System Interface (SCSI)", ANSI, X3, 131, 1986.

Figure 2:
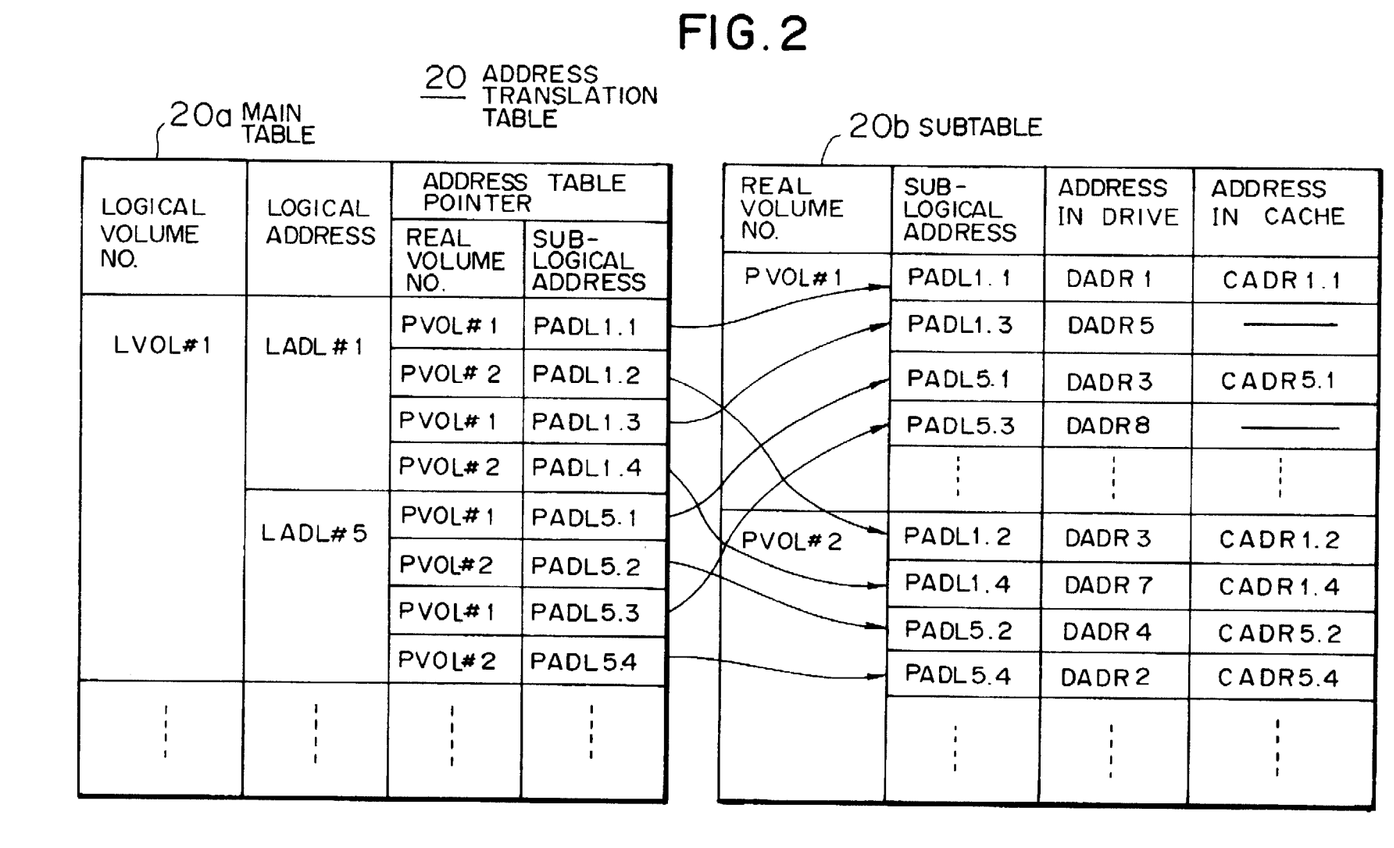
FIG. 2 is a diagram showing an address translation table which is used in the first embodiment of the invention.

The CPU 1 sends a volume No. and an address in volume to the disc controller 2 as a write request and write destination address through the host bus HB and also sends write data. The disc unit of one volume No. which is designated at present to the CPU 1 is realized by two disc units 56(1) and 56(2) in the embodiment. Therefore, the volume number and the address in volume which are designated by the CPU 1 are processed as a logical volume No. and a logical address. The address translation table 20 is used to convert the address information which is designated by the CPU 1 into the real volume No. and the real address in volume. In the embodiment, it is now assumed for simplicity of explanation that the data which is written or read out by the CPU 1 has a predetermined length. The present invention can also obviously be applied to the case of processing data of a length which is arbitrarily integer times as large as a fixed length or data of an arbitrary variable length.

In accordance with instructions from the MP 100, the channel interface circuit 9 executes a protocol translation for the information transferred from the CPU 1 and adjusts a transfer speed of the host bus HB to a processing speed in the disc controller 2 and supplies those information to the data control circuit (DCC) 10. The data control circuit 10 sends the request and address in those information to the MP 100. The MP 100 checks to see if the request generated from the CPU 1 is a read request or a write request or not. The MP 100, further, converts the address (logical volume No. and logical address) designated by the CPU 1 into the real address on the basis of the address translation table 20. That is, the logical volume No. and the logical address which were sent from the CPU 1 are converted into the real volume No. as a unit address of the disc unit in which the data has actually been stored and into the address in drive indicative of the real position in drive at which the data has actually been stored.

More specifically speaking, the address translation table 20 includes a main table 20a and subtable 20b as shown in FIG. 2. The main table 20a is a table to convert a combination of the logical volume No. and the logical address into address table pointers. Each address table pointer includes a real volume No. and a sublogical address. The subtable 20a is a table to convert the address table pointer into the address in drive.

In the embodiment, the write data designated by the CPU is divided into four data blocks a, b, c, and d and written into the two disc units 56(1) and 56(2).

Therefore, for one set of the logical volume No. and the logical address designated by the CPU 1, four address table pointers are stored into the main table 20a and the address table pointers include mutually different real drive Nos. A sublogical address in each address table pointer is a logical address which is used to identify the address in drive and its magnitude sequentially changes for the four blocks a, b, c, and d. For instance, the sublogical addresses include addresses which sequentially increase and their values are unconditionally decided in the same real drive.

For each address table pointer (namely, a set of logical addresses), the subtable 20b holds the address in drive. When the data has been held in the cache memory 4, the subtable 20b holds an address in cache.

The storage of the information in the address translation table 20 mentioned above is executed when write request of data of the same denomination is first generated from the CPU 1. Namely, in this instance, the MP 100 selects every two of the four regions each having a size of ¼ of the capacity requested by such a write request from space regions in the drives 7(1) and 7(2), respectively. Various kinds of information shown in FIG. 2 regarding the four space regions are stored into the table 20.

In the following description, it is assumed that the write request which is at present being processed is not the first write request and the regions as targets of the write request have already been assured in the drives 7(1) and 7(2).

In the embodiment, although the sublogical address has been converted into the address in drive in the disc controller 2, such a conversion can be also performed in the disc unit.

On the other hand, the write data from the CPU 1 is transferred to the cache adapter 11 and is stored into the buffer $C_b$ in the cache memory 4 by the cache adapter circuit 11. In this instance, the address in cache is registered into the address translation table 20. When an updating request is subsequently generated for the data remaining in the cache memory 4, thus, the data in the cache memory 4 can be rewritten in accordance with the address in cache in the address translation table 20.

When the MP 100 confirms that the data has been stored in the cache memory 4 as mentioned above, the MP 100 reports the completion of the writing processes to the CPU 1.

Among the four blocks which are obtained by dividing the data designated by the CPU 1, the MP 100 takes out the first data block a to be written into the disc unit 56(1) from the buffer $C_b$. The MP 100 connects the disc unit 56(1) to the SCSI bus SB and sends the data block a, identifiers consisting of address table pointers (in the example, PVol#2 and PADL1.1) allocated to the data block a, the write request, and the address in drive to the disc unit 56(1) from the drive interface circuit 13 of the lower interface controller 5. After completion of the transfer of the data block a to the disc unit 56(1), the drive interface circuit 13 disconnects the disc unit 56(1) from the SCSI bus SB.

In a manner similar to the above, the MP 100 subsequently takes out the first data block b to be written into the disc unit 56(2) from the buffer $C_b$. The MP 100 connects the disc unit 56(2) to the SCSI bus SB and sends next identifiers (in the example, PVol#2 and PADL1.2), the data block b, the address in drive, and the write request to the disc unit 56(2) from the drive interface circuit 13 of the lower interface controller 5. After completion of the transfer of the data block b to the disc unit 56(2), the drive interface circuit 13 disconnects the disc unit 56(2) from the SCSI bus SB.

During the above period of time, the disc unit 56(1) receives the data block a, the identifiers, and the address in drive which have already been sent by the drive interface 7(1)c and holds those information into the local buffer 7(1)b by the MP 7(1)a. The MP 7(1)a writes the data block and the identifiers from the local buffer 7(1)b to the position in the drive 7(1) indicated by the address in drive. The data block a is written into the drive 7(1) in parallel with the transfer of the data block b. When the local buffer 7(1)b becomes empty, the drive controller 7(1)c informs such a fact to the disc controller 2 and requests for the transfer of the next data block. On the other hand, in a manner similar to the case of the data block a, the disc unit 56(2) writes the transmitted data block b to the disc in parallel with the writing of the data block a to the drive after the identifiers were held in the local buffer 7(2)b. In a manner similar to the above, the next data blocks c and d are written into the disc units 56(1) and 56(2).

In the embodiment, the data blocks are alternately transferred to the two disc units 56(1) and 56(2) through the bus SB.

Figure 3:
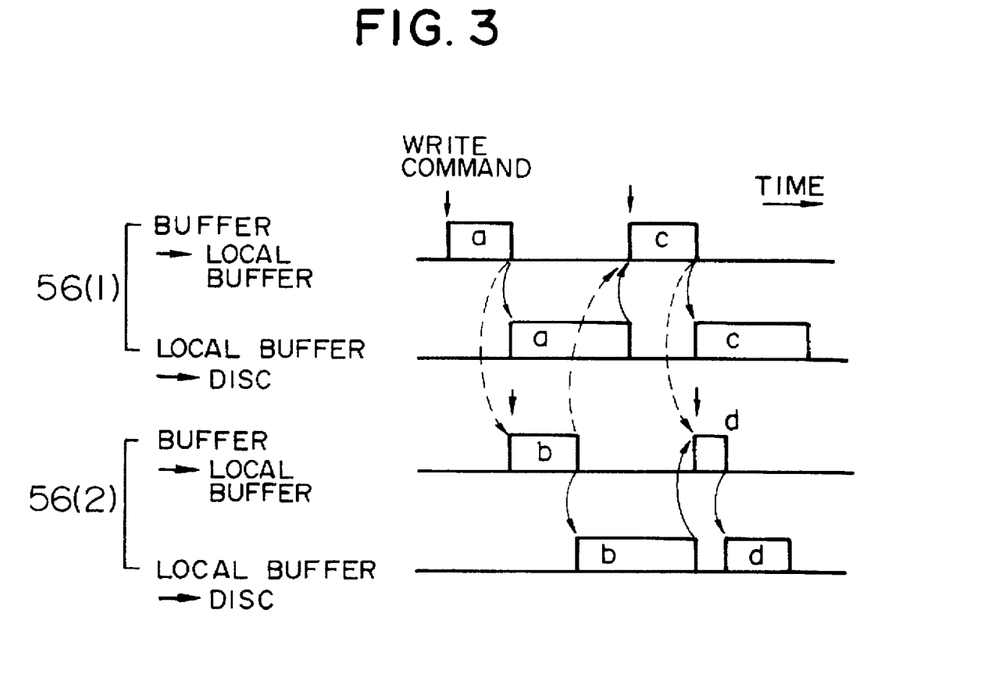
FIG. 3 is a timing chart for data writing processes in the disc subsystem of FIG. 1.

FIG. 3 shows the above writing processes. In the embodiment, although the SCSI bus SB is switched and used, the time which is required to transfer one data block is shorter than the time which is needed to write the data block into the drive. Therefore, the operations of the two disc units 56(1) and 56(2) are close to a state in which those two disc units operate in parallel. Thus, the time which is required to write the data block in the embodiment is slightly longer than the time in case of the disc subsystem 601 of FIG. 12 and is relatively short time.

Figure 4:
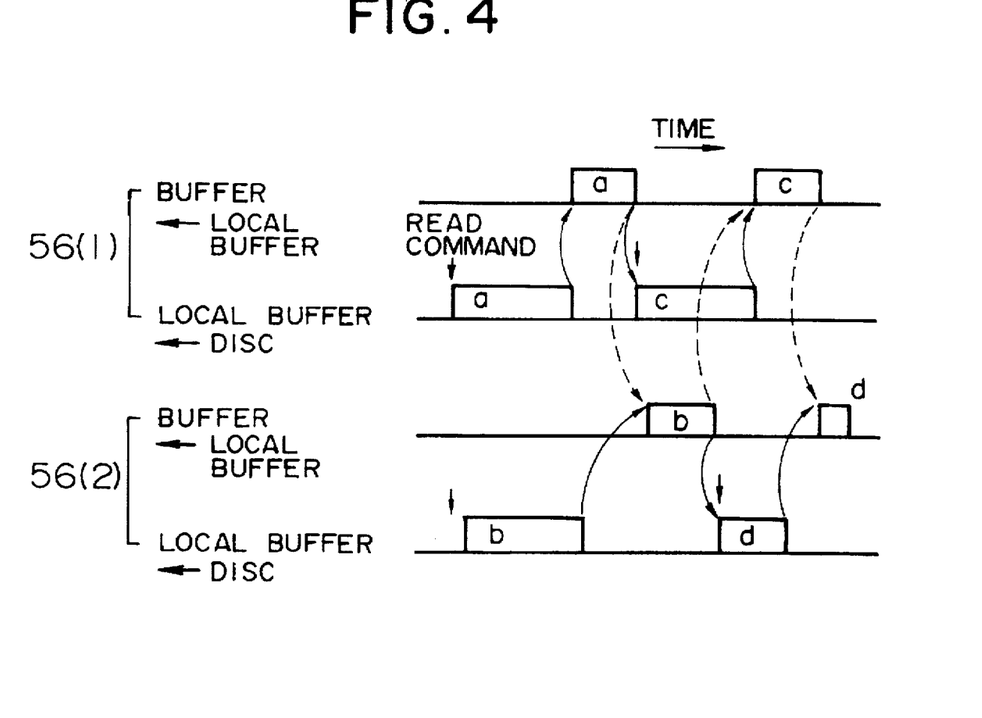
FIG. 4 is a timing chart for data reading processes in the disc subsystem of FIG. 1.

A procedure for data reading processes will now be described hereinbelow with reference to FIGS. 4 and 5.

The CPU 1 sends a read request, a read destination logical volume No., and a logical address to the disc controller through the channel path 8.

When the MP 100 recognizes a read request command, the MP 100 performs the address conversion of the relevant data with reference to the address translation table 20 stored in the buffer $C_b$ in the cache memory 4. The MP 100 further discriminates whether a desired address exists in the address cache memory 4 or not by checking the address in cache.

At the time of cache hitting, the MP 100 converts the addresses (the relevant volume No. and the logical address) designated from the CPU 1 into the address in cache in the cache memory 4 with reference to the address translation table 20. The MP 100 subsequently reads out four data blocks constructing the relevant data from the cache memory 4. Specifically speaking, the data blocks are read out from the cache memory 4 by the cache adapter circuit (C Adp) 11 in accordance with command of the MP 100. The data read out by the cache adapter circuit 11 is transferred to the channel interface circuit (CH IF) 9 by the control of the data control circuit (DCC) 10. The channel interface circuit 9 converts the data into the protocol of the channel interface in the CPU 1 and adjusts the speed to the speed corresponding to the channel interface. After completion of the protocol conversion and the speed adjustment in the channel interface circuit 9, the data is transferred to the CPU 1 by the channel path 8.

On the other hand, in case of mis-hit of the cache, the MP 100 instructs so as to generate a read request to the disc unit. The drive interface circuit 13 generates a read command through the SCSI bus SB in accordance with a read processing procedure of the SCSI.

In a manner similar to the case of writing, the disc controller 2 determines the address pointers for the four data blocks constructing the data requested from the logical volume No. and the logical address designated by the CPU 1 with reference to the address translation table 20 in the cache memory 4 by the MP 100. The disc controller 2 decides the address in drive corresponding to the four address pointers determined. The real volume Nos. and the addresses in drive are determined for the four data blocks for the requested data. The four data blocks are read out as follows in accordance with the reverse order of the magnitudes of the sublogical addresses included in the address table pointers.

In accordance with the instruction of the MP 100, the drive interface circuit 13 connects the disc unit, for example, 56(1) to which the real volume No. for the first data block a is allocated to the SCSI bus SB and sends the read command and the address in drive to the disc unit 56(1) and subsequently disconnects the disc unit 56(1) from the SCSI bus SB.

In the disc unit 56(1) to which the read command was supplied from the drive interface circuit 13, a seeking process to the transmitted address in drive and an accessing process for latency are executed under control of the MP 7(1)a.

In parallel with the accessing process, the MP 100 instructs to read out the next data block b in accordance with a similar procedure.

On the other hand, in the disc unit 56(1), the data block with the same identifier as that sent from the position of the address in drive transmitted is read out and held in the local buffer 7(1)b under the control of the MP 7(1)a. The physical drive 7(1) is connected to the SCSI bus SB and transfers the data block together with the identifier to the drive interface circuit 13 through the SCSI bus SB. In the drive interface circuit 13, only the data block a in the data block a with the identifier transferred is transmitted to the cache adapter circuit (C Adp) 12 on the drive side. In the cache adapter circuit 12, the data block a is stored into the buffer $C_b$ in the cache memory 4, the identifier is transferred to the MP 100, and the cache adapter circuit 12 is disconnected from the SCSI bus SB. In parallel with the reading and transferring processes of the data block a, the disc unit 56(2) similarly executes the reading operation of the data block b. After the data block a was transferred, the data block b is transferred by using the SCSI bus S. In a manner similar to the above, the data blocks c and d are respectively read out from the disc units 56(1) and 56(2).

The MP 100 concatenates the data blocks a, b, c, and d in accordance with the reverse order of the magnitudes of the sublogical addresses in the identifiers added to the data blocks and constructs the read data and sends the read data to the CPU 1 by the upper interface controller 3.

The data reading processes are finished as mentioned above. The operations in this instance are as shown in FIG. 4. In the above case as well, in a manner similar to the case of writing the data, a desired time which is required to read out the data is slightly longer than the time in case of the disc subsystem of FIG. 12 and is a relatively short time.

According to the disc subsystem 101, the time which is required to write/read out the data is relatively short and the SCSI bus SB is common, so that the construction is simplified.

Since the data writing/reading operations are merely executed to the logical disc unit when they are seen from the CPU 1 side, a general construction can be used as a construction (OS) of the CPU 1.

In the above first embodiment, although the two disc units 56(1) and 56(2) have been used, the present invention can be also similarly applied to the case of using three or more disc units.

Second embodiment

Figure 5:
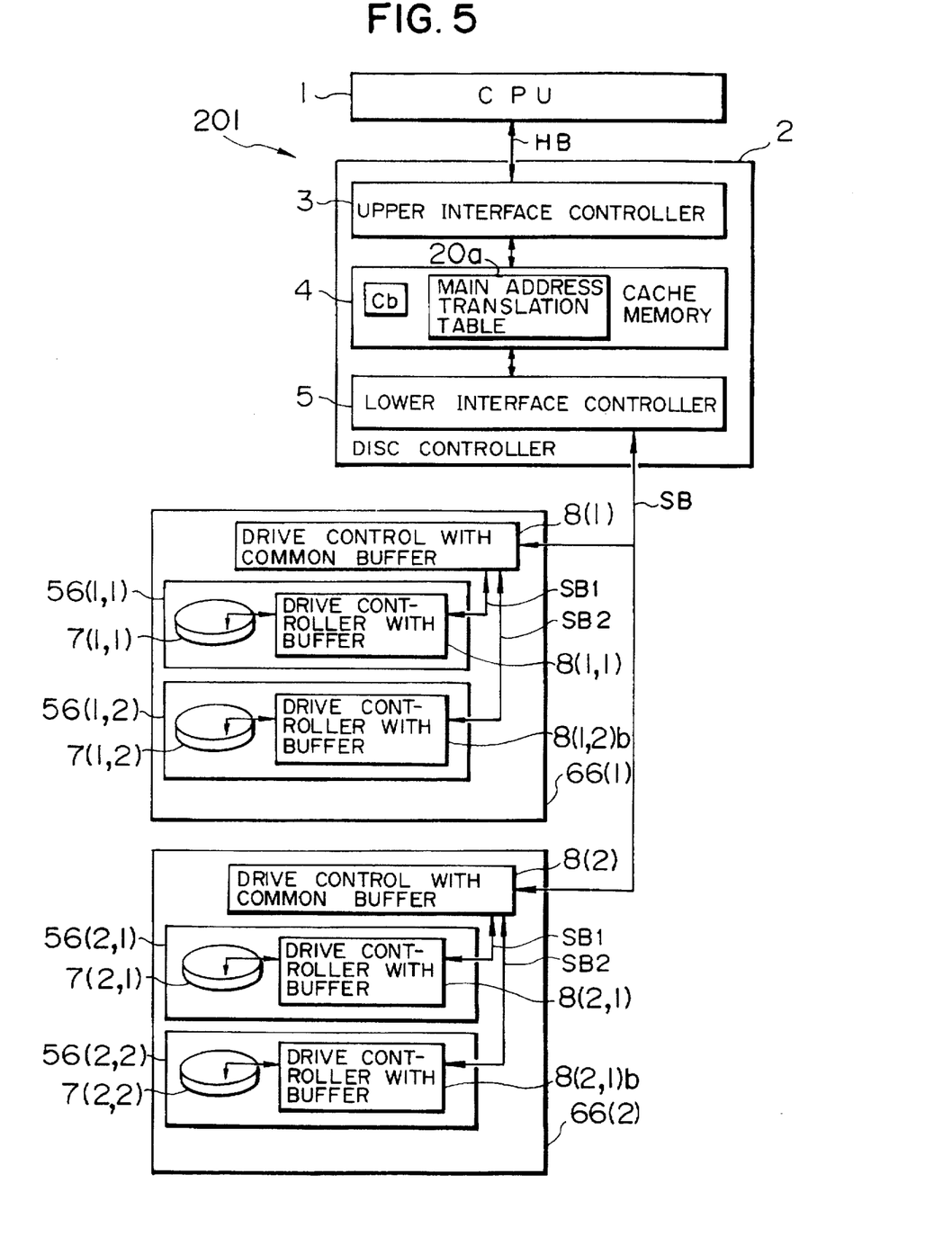
FIG. 5 is a whole constructional diagram of disc subsystem according to the second embodiment of the present invention.

FIG. 5 is a whole constructional diagram of a disc subsystem 201 according to the second embodiment of the present invention.

The disc subsystem 201 has parallel disc units 66(1) and 66(2) in place of the disc units 56(1) and 56(2) in the first embodiment.

The parallel disc unit 66(1) comprises: a common buffer 7 drive control 8(1); and two disc units 56(1,1) and 56(1,2) connected in parallel with the drive control 8(1) through SCSI buses SB$_1$ and SB$_2$. The disc unit 56(1,1) includes a drive 7(1,1) and a drive controller 8(1,1) with a buffer. The disc unit 56(1,2) includes a drive 7(1,2) and a drive controll 8(1,2) with a buffer.

The parallel disc unit 66(2) also has substantially the same construction as that mentioned above.

Figure 6:
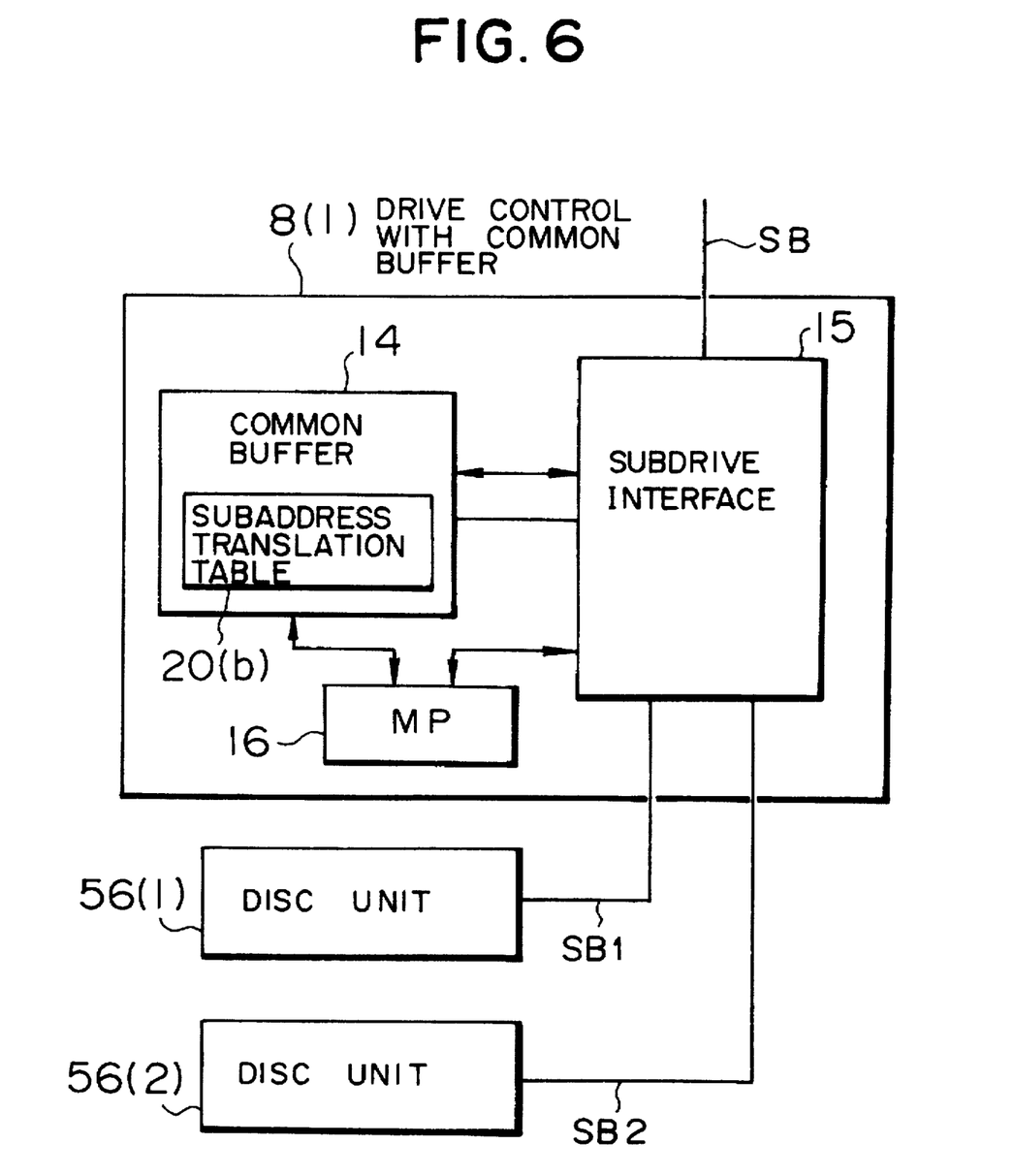
FIG. 6 is a constructional diagram of a drive controller with a common buffer in the second embodiment of the invention.

As shown in FIG. 5, the common buffer drive control 8(1) comprises: a microprocessor 16 to control the parallel disc unit 66(1); a common buffer memory 14; and a subdrive interface 15. The subdrive interface 15 executes the data transfer control between the drive interface 13 (FIG. 1) in the disc controller 2 and the common buffer memory 14 and the data control between the common buffer memory 14 and the disc units 56(1,1) and 56(1,2) in the parallel disc unit 66. A structure of the disc unit 56(1,1) or 56(1,2) is the same as that shown in FIG. 1 and includes the drive controller 8(1,1) or 8(1,2) and the drive 7(1,1) or 7(1,2). A structure of the drive controll 8(1,1) or 8(1,2) is the same as the drive control 8(1) in FIG. 1 and has a buffer memory therein. A structure of the parallel disc unit 66(2) is also substantially the same as the parallel disc unit 66(1) mentioned above.

In the disc subsystem 201, the parallel disc unit 66(1) or 66(2) functions as a virtual drive for the disc controller 2.

The disc controller 2 has substantially the same structure as that in the embodiment 1.

Figure 7:
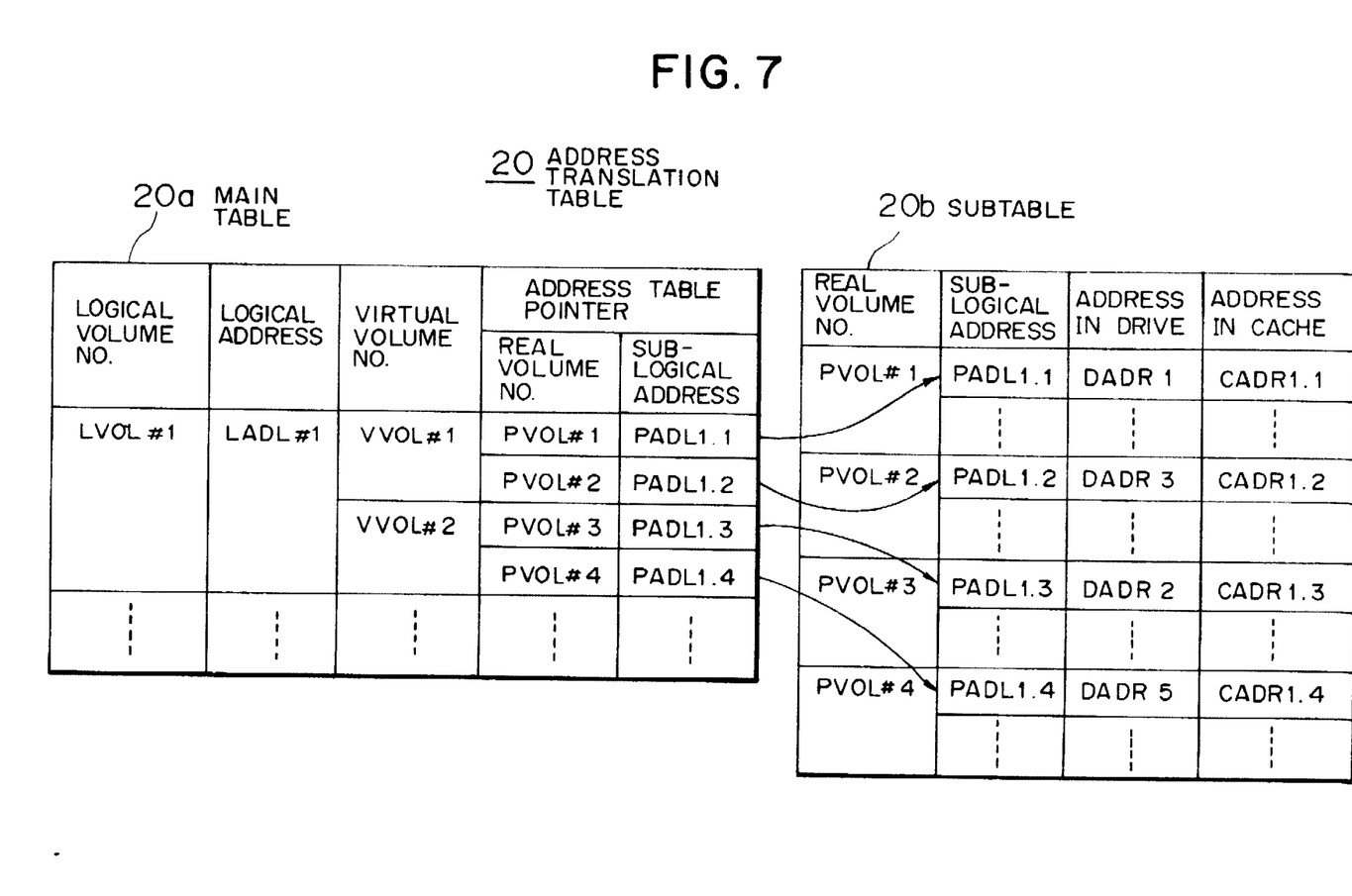
FIG. 7 is a diagram showing an address translation table which is used in the second embodiment of the invention.

According to the second embodiment, as shown in FIG. 7, the main table 20a included in the address translation table 20 determines four address table pointers allocated to the four data blocks a to d constructing the data to be accessed for a combination of the logical volume No. and the logical address designated from the CPU 1 in a manner similar to the embodiment 1. The second embodiment, however, differs from the first embodiment with respect to a point that the numbers of the parallel disc units 66(1) and 66(7) are determined as virtual volume numbers for the combination of the two data blocks a and b and the combination of the two data blocks c and d. The main table 20a and the subtable 20b are held in the cache memory (not shown) in the disc controller 2 in a manner similar to the case of the first embodiment. The second embodiment differs from the first embodiment with respect to a point that the copy of the subtable 20b is, further, held in the buffers 14 in the drive controls 8(1) and 8(2).

The second embodiment, for example, the common buffer 14 in the drive control 8(1) or 8(2) has capacity which is twice as large as that of the local buffer 7(1)b or 7(2)b in FIG. 1 and holds two data blocks in the first embodiment. Therefore, the data block A in which the data blocks a and b are combined and the data block B in which the data blocks c and d are combined are respectively transferred through the common SCSI bus SB between the disc controller and the parallel disc units 66(1) and 66(2), respectively.

The writing operation in the second embodiment will now be described mainly with respect to a point different from the first embodiment. When a write request is received from the CPU 1, the disc controller 2 decides two virtual volume Nos. (actually, the numbers of the parallel disc units 66(1) and 66(2)) from the logical volume Nos. and the logical addresses sent from the CPU 1 for the four data blocks a, b, c, and d constructing the data to be written. After that, the data block A including the data blocks a and b is transferred to the parallel disc unit 66(a) by using the first virtual volume No. VVO#1. Subsequently, the data block b comprising the data blocks c and d is transferred to the parallel disc unit 66(2) through the SCSI bus SB by using the second virtual volume No. VVO#2. When the data block A is transferred, the address table pointers allocated to the data blocks a and b are also transferred as identifiers.

In the parallel disc unit 66(1), the microprocessor 16 which holds the data block A transferred from the drive control 8(1) into the common buffer 14 determines addresses in drive as addresses in the physical drive in which the data blocks a and b have actually been stored from the address table pointers (including the real volume Nos. and the logical addresses) for the data blocks a and b sent together with the data block A with reference to the subtable 20b provided in the common buffer 14.

The MP 16 subsequently instructs the subdrive interface 15 so as to execute the writing process of the data blocks a and b into the physical drives 7(1,1) and 7(1,2). In this instance, the identifiers allocated to the data block A and the address in drive which has been determined for the data block a or b are added to the data block a or b and the resultant data block a or b is transferred. Thus, the interface 15 transfers the data blocks a and b to the drive controls 8(1,1) and 8(1,2) in parallel through the SCSI buses SB$_1$ and SB$_2$, respectively. The controls 8(1,1) and 8(1,2) hold the data blocks a and b into buffers (not shown) provided therein and, after that, write them into the drives 7(1,1) and 7(1,2). The data blocks a and b which were transferred to the drive control 8(1) are written in parallel into the physical drives 7(1,1) and 7(1,2). Even in case of the parallel disc unit 66(2) as well, the data block B is processed in a manner similar to the case of the parallel disc unit 66(1). The data blocks c and d are simultaneously written in parallel into real drives 7(2,1) and 7(2,2).

When the data blocks a to d are written, the address table pointers allocated to those data blocks are written as identifiers together with those data blocks.

In this instance, the data blocks are written into the physical drives by a method similar to that in case of writing the data blocks to the disc units by the disc controller 2 in the embodiment 1. In the second embodiment, the data blocks A and B are sequentially transferred through the common SCSI bus SB. However, the data blocks a, b, c, and d are written in parallel into the real drives. Further, the transfer times of the data blocks A and B are shorter than the writing time of any one of the data blocks a, b, c, and d into the drive. Therefore, according to the second embodiment, a time which is required to write the data block a, b, c, or d into the drive is about ½ of that in the first embodiment.

When the data blocks a to d written as mentioned above are read out, in a manner opposite to the case of writing, in the parallel disc unit 66(1), the drive control 8(1) reads out in parallel the data blocks a and b from the real drives 7(1.1) and 7(1.2) and the data blocks a and b are combined by the drive control 8(1) on the basis of the identifiers provided for the data blocks a and b, thereby forming the data block A. The data block A is transferred to the buffer $C_b$ in the cache memory 4 of the disc controller 2. In this instance, the identifiers added to the data blocks a and b are used as identifiers of the data block A.

In the parallel disc unit 66(2) as well, the data block B is similarly stored into the buffer $C_b$ in the cache memory 4 of the disc controller 2.

The disc controller 2 concatenates the transmitted data blocks A and B on the basis of the identifiers added thereto and constructs read data and sends the read data to the CPU 1 by the upper interface controller 3.

According to the disc subsystem 201, the time to write/read out the data is relatively short and the SCSI bus SB is commonly used, so that the construction is simplified. On the other hand, since a virtual drive of a large capacity is connected to the SCSI bus SB, the number of connecting/disconnecting times of the virtual drive to/from the SCSI bus can be reduced.

In the second embodiment, although the parallel disc unit has two physical drives, the present invention can be also similarly applied to the case where the parallel disc unit has three or more physical drives.

Third embodiment

Figure 8:
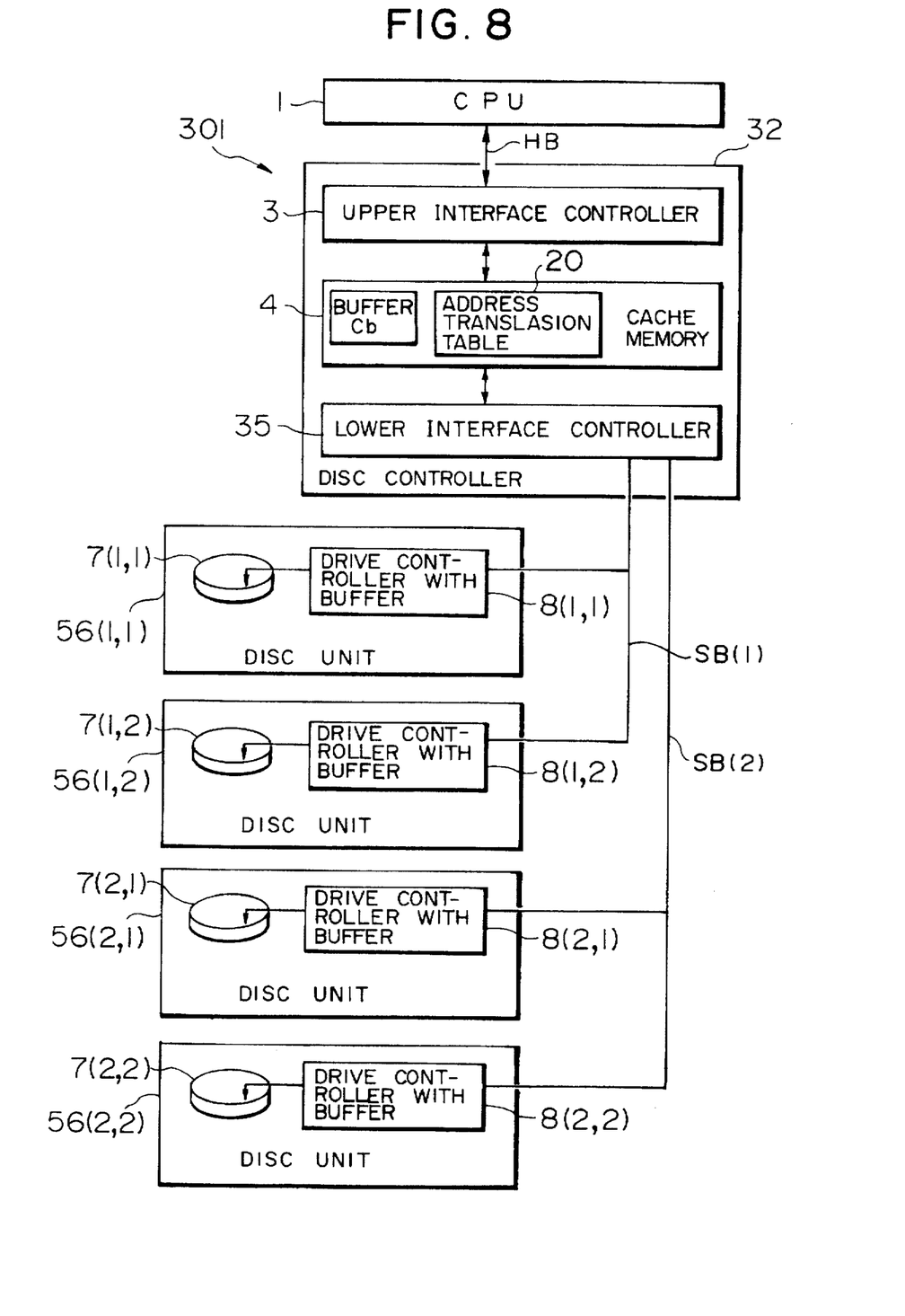
FIG. 8 is a whole constructional diagram of disc subsystem according to the third embodiment of the present invention.

FIG. 8 is a whole constructional diagram of a disc subsystem 301 according to the third embodiment of the present invention. In the diagram, the same component elements as those shown in FIG. 1 or 5 are designated by the same reference numerals.

The disc subsystem 301 comprises a disc controller 32 and four disc units 56(1.1), 56(1.2), 56(2.1), and 56(2.2) and is connected to the CPU 1.

In the third embodiment, the controller 32 has two SCSI buses SB(1) and SB(2). The two disc units 56(1.1) and 56(1.2) are connected to the disc controller 32 by one SCSI bus SB(1). The other two disc units 56(2.1) and 56(2.2) are connected to the disc controller 32 by one SCSI bus SB(2).

Figure 9:
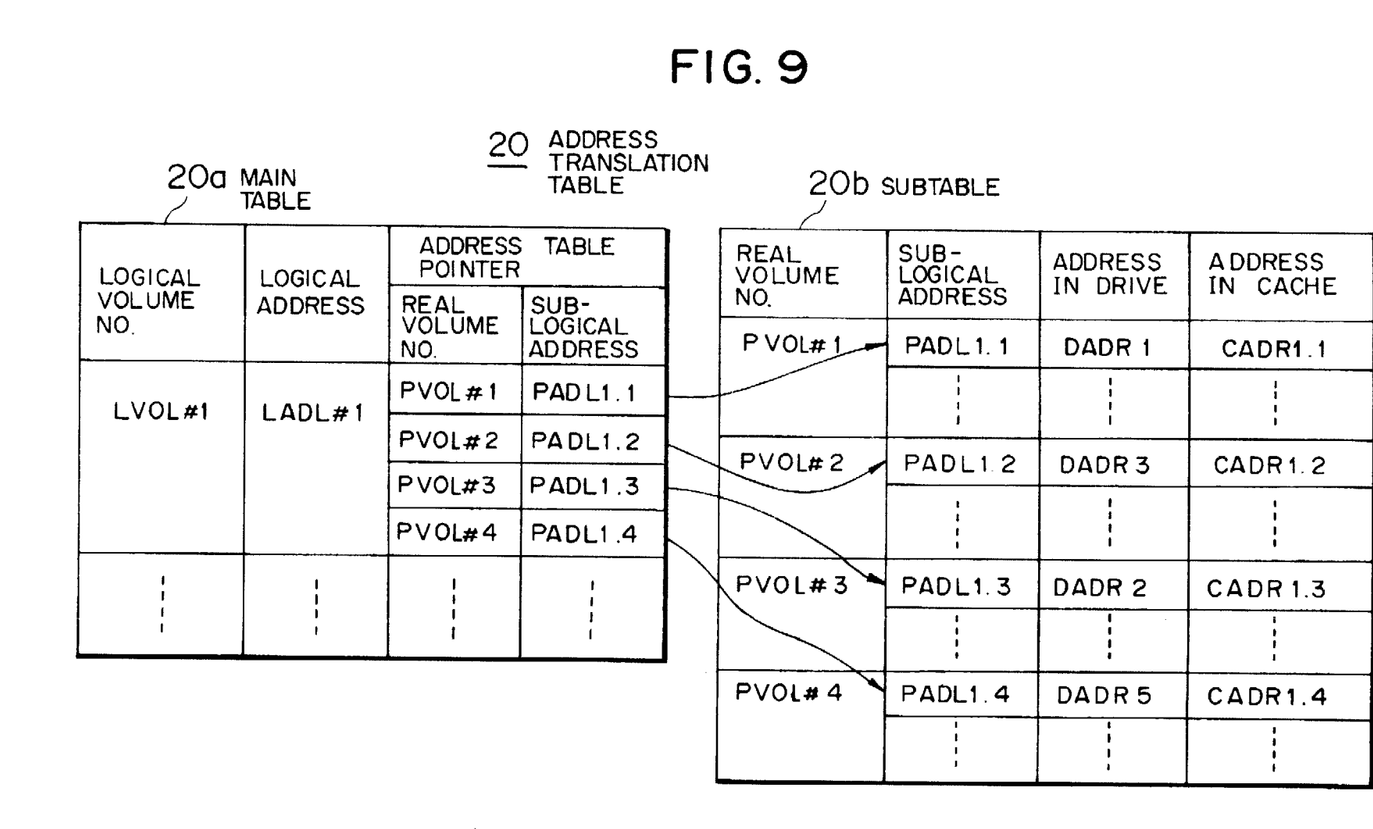
FIG. 9 is a diagram showing an address translation table which is used in the third embodiment of the invention.

The address translation table 20 which is used in the third embodiment is as shown in FIG. 9 and is substantially the same as that shown in FIG. 2.

Figure 10:
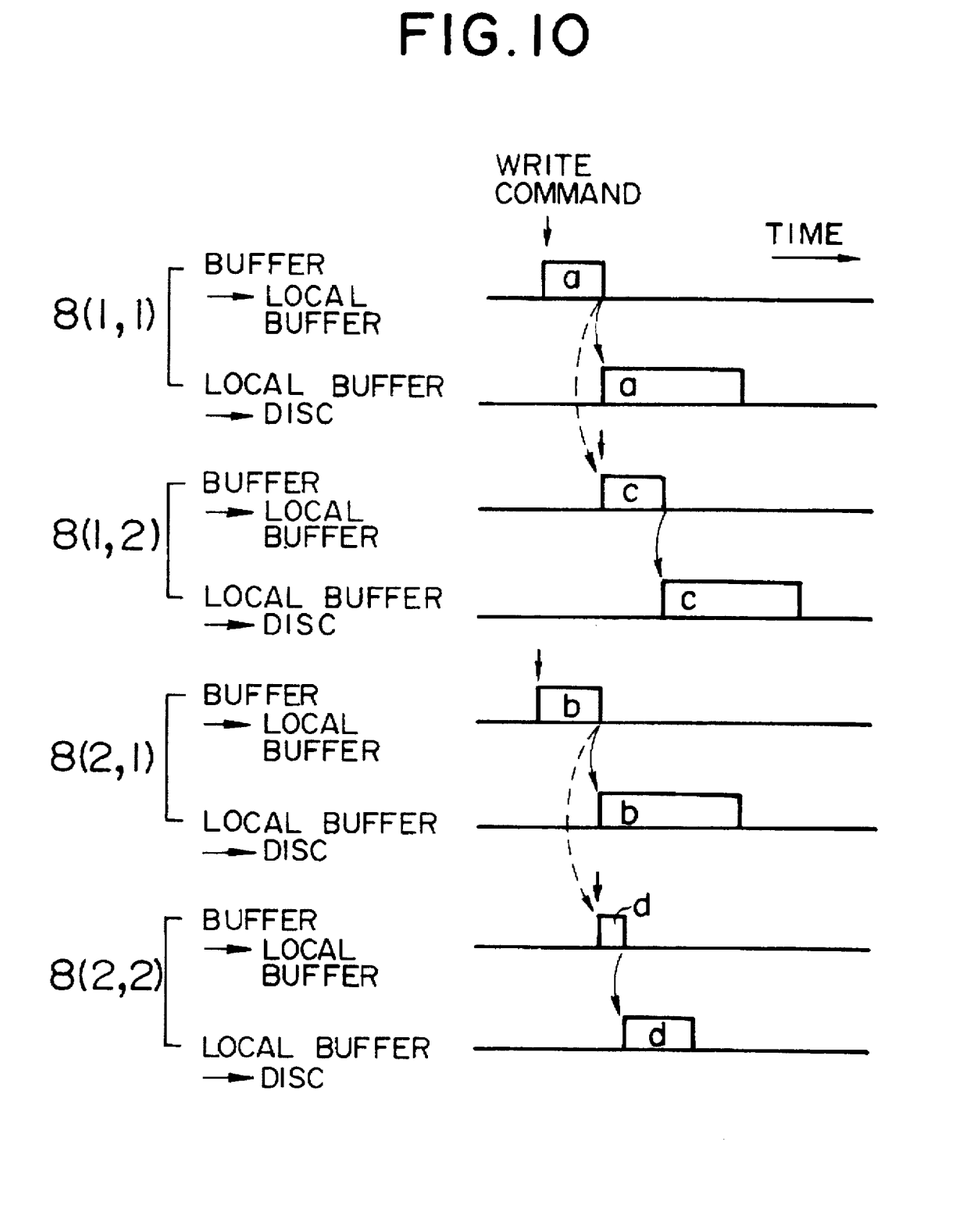
FIG. 10 is a timing chart for data writing processing in the disc subsystem of FIG. 8.

A procedure for a data writing process will now be described with reference to FIG. 10.

The disc controller 32 determines address table pointer drive addresses for four data blocks constructing the write data on the basis of the logical volume Nos. and the logical addresses sent from the CPU 1 in a manner similar to the case of the first embodiment. The third embodiment differs from the first embodiment with respect to a point that the data blocks a, c, b, and d are allocated to the disc units 56(1.1), 56(1.2), 56(2.1), and 56(2.2).

By a procedure similar to that in the first embodiment, the data blocks a and c are sequentially transferred to the disc units 56(1.1) and 56(1.2) through the SCSI bus SB(l), respectively, and are stored into the drives 7(1.1) and 7(1.2).

In parallel with the above processes, the data blocks b and d are transferred in parallel to the disc units 56(2.1) and 56(2.2) through the SCSI bus SB(2) and are stored into the physical drives 7(2.1) and 7(2.2), respectively.

In a manner opposite to the case of writing, upon reading, the data blocks a and c are read out from the physical drives 7(1.1) and 7(1.2) to the disc controller 32 by a procedure similar to that in the first embodiment. In parallel with the above reading processes, the data blocks b and d are read out from the physical drives 7(2.1) and 7(2.2) and are sent to the disc controller 32. The data blocks a, b, c, and d are concatenated in accordance with the order of the subaddresses included in the identifiers added to the data blocks a to d, thereby forming the read data. The read data is sent to the CPU 1 by the upper interface controller 3.

The data writing processes are finished as mentioned above. The time which is required to write the data blocks are slightly longer than the time in case of connecting four disc units in parallel by four SCSI buses and is a relatively short time.

The data reading processes are executed by a procedure opposite to that for the data writing processes.

According to the third embodiment, the data writing/reading speed can be further improved.

According to the disc subsystem of the present invention as mentioned above, the data writing/reading time can be reduced by the simple construction.

The present invention is not limited to the foregoing embodiments but many modifications and variations are possible within the spirit and scope of the appended claims of the invention.

What is claimed is:

1. A disc subsystem comprising:

a disc controller;

a plurality of disc units which are classified into a plurality of disc unit groups;

a plurality of transfer controllers each of which is provided in correspondence to each of said disc unit group;

a plurality of individual buses each of which is provided in correspondence to each of said disc units and is used to connect each corresponding one of the disc units to one of said plurality of transfer controllers provided in correspondence to the disc unit group to which said disc unit belongs; and a common bus to connect said plurality of transfer controllers to the disc controller, wherein said disc controller has means for dividing data whose writing operation was requested from an external apparatus into a plurality of data blocks and for deciding the disc unit into which each of the data blocks should be written, means for translating, by using a table, a logical address designated by said external apparatus into a physical address in the disc unit into which a given data block is to be written, means for determining data block groups in which each data block group comprises data blocks to be written into different disc units belonging to the same disc unit group, and means for transferring through said common bus a data block group to be written into a disc unit group to the transfer controller provided in correspondence to said disc unit group, whereby said means sequentially transfers different data block groups to said plurality of transfer controllers while data blocks in a previously transferred data block group are dispersed in parallel to the disc units by the corresponding transfer controller through the individual buses provided in correspondence to the disc units, and each of the transfer controllers has a buffer, and means for writing the plurality of data blocks belonging to the data block group transferred through the common bus into said buffer and for transferring in parallel said plurality of written data blocks to the plurality of disc units connected to said transfer controller through the individual buses provided in correspondence to the disc units, and each of the disc units has a disc drive, a buffer, and means for writing the data block transferred from the transfer controller to which the disc unit is connected into said buffer and for writing said written data block into the disc drive.

2. A disc subsystem according to claim 1, wherein said transfer means included in the disc controller has means for transferring one of the data block groups to be written into either one of the disc unit groups to one of the transfer controllers provided in correspondence to said disc unit group, and thereafter for transferring another data block group to be written into another disc unit group to another transfer controller provided in correspondence to said another disc unit group in parallel with that the plurality of data blocks belonging to said one data block group are transferred and written from said transfer controller to the plurality of disc units belonging to said disc unit group.

3. A disc subsystem according to claim 1, wherein said disc controller has means for deciding the plurality of data blocks constructing the data whose reading operation was requested from said external apparatus and for deciding the disc unit to hold each of the decided data blocks, and means for transferring through said common bus a plurality of read commands for said plurality of data block groups comprising said plurality of data blocks which were determined such that they were respectively mutually held in the same disc unit group to the transfer controller provided in correspondence to said disc unit group, in which said transfer means sequentially transfers said plurality of read commands for the different data block groups to the different transfer controllers through the common bus, each of said transfer controllers further has means for transferring in parallel the read commands of said plurality of data blocks constructing the data block group to the plurality of disc units connected to said transfer controller through the individual buses provided in correspondence in each of said disc units in response to the read command of the data block group supplied from said disc controller, each of said disc units further has means for reading out the data block designated by the read command from a disc drive included in the disc unit in response to the read command of the data block from the transfer controller to which said disc unit is connected and for storing the read-out data block into the buffer in said disc unit, and means for transferring said read-out data block to said transfer controller via the individual bus connected to said disc unit, each of said transfer controller further has means for transferring the data block group consisting of the plurality of data blocks transferred from said plurality of disc units connected thereto to the disc controller through the common bus, and said disc controller further has means for concatenating said plurality of data block groups transferred from said plurality of transfer controllers and for transferring to the external apparatus as read data.

4. A disc subsystem comprising:

a disc controller;

a plurality of disc units which are classified into a plurality of disc unit groups each consisting of a plurality of disc units; and a plurality of common buses each of which is provided in correspondence to each of said disc unit groups and is used to connect the plurality of disc units belonging to each corresponding one of the disc unit groups to said disc controller, wherein said disc controller has means for dividing data whose writing operation was requested from an external memory device into a plurality of data blocks and for deciding the disc unit into which each of the data blocks should be written, means for translating, by using a table, a logical address designated by said external memory device into a physical address in the disc unit into which a given data block is to be written, means for determining data block groups in which each data block group comprises data blocks to be written into different disc units belonging to the same disc unit group, and means for sequentially transferring the data blocks in a data block group to be written into a disc unit group through the common bus provided in correspondence to said disc unit group, whereby said transfer means transfers the different data block groups through the different common busses in parallel, and each of the disc units has a disc drive to hold at least one data, a buffer, and control means for writing said one data block transferred to the disc unit through the common bus provided for the disc unit group to which said disc unit belongs into the buffer and for transferring said written data block from said buffer to said disc drive in a manner such that a next data block which belongs to the data block group is transferred to another disc unit in parallel with the writing of said one data block to the disc drive.

5. A disc subsystem according to claim 4, wherein said transfer means has means for transferring one of the data blocks belonging to each of the data block groups to one of the disc units and, thereafter, for transferring the plurality of data blocks belonging to each data block group in a manner such that the next data block which belongs to the data block group and is subsequent to said one data block is transferred to another disc unit in parallel with the transferring of said one data block from said one disc unit to the disc drive.

6. A disc subsystem according to claim 4, wherein said disc controller further has means for deciding the plurality of disc units which hold the plurality of data blocks constructing the data whose reading operation was requested from the external memory device, and means for transferring a plurality of read commands to said plurality of disc units in order to read out the data blocks, in which said means sequentially transfers the read command of the plurality of data blocks which were determined that they were held in the plurality of disc units belonging to the same disc unit group to said plurality of disc units through the common bus provided in correspondence to said disc unit group and transfers a plurality of the other read commands for the other disc unit groups in parallel with said plurality of read commands, each of said disc units further has means for reading out the data block designated by the read command from the disc drive in said disc unit in response to the read command supplied from said disc controller and for storing the read-out data block into the buffer in the disc unit, and means for transferring the read-out data block to the disc controller via the common bus connected to said disc unit, and said disc controller further has means for concatenating the plurality of data blocks transferred from said plurality of disc units and for forming read data.

7. A disc subsystem comprising:

a disc controller;

a plurality of disc unit groups, each disk unit group having two or more disk units;

a plurality of transfer controllers each of which is provided in correspondence to each of said plurality of disc unit groups;

a plurality of individual buses each of which is provided for each of the disc units and is used to connect each corresponding disc unit to one of said plurality of transfer controllers provided in correspondence to the disc unit group to which said disc unit belongs; and a common bus to connect said plurality of transfer controllers to said disc controller, wherein said disc controller has means for deciding the disc unit into which each data block should be written, means for translating, by using a table, a logical address designated by said external apparatus into a physical address in the disc unit into which a given data block is to be written, means for determining data block groups in which each data block group comprises data blocks to be written into different disc units belonging to the same disc unit group, and means for transferring through said common bus a data block group to be written into the different disc units belonging to the same disc unit group to the transfer controller provided in correspondence to said disc unit group, whereby said transfer means sequentially transfers different data block groups to said plurality of transfer controllers while data blocks in a previously transferred data block group are dispersed in parallel to the disc units by the corresponding transfer controller through the individual buses provided in correspondence to the disc units, each of said transfer controllers has a buffer, and means for writing the plurality of data blocks belonging to the data block group transferred through the common bus into the buffer and for transferring parallel said plurality of written data blocks into the plurality of disc units connected to said transfer controller through the individual buses provided in correspondence to the disc units, and each of the disc units has a disc drive, a buffer, and means for writing the data blocks transferred from the transfer controller to which said disc unit is connected into the buffer and for writing said written data blocks into the disc drive of said disc unit.

8. A disc subsystem according to claim 7, wherein said transfer means included in the disc controller has means for transferring one data block group to be written into one of the disc unit groups to one of the transfer controllers provided in correspondence to said disc unit group and, thereafter, for transferring another data block group to be written into another disc unit group to another transfer controller provided in correspondence to another disc unit group in parallel with a transferring of the plurality of data blocks belonging to said one data block group from said transfer controller to the plurality of disc units belonging to said disc unit group.

9. A disc subsystem according to claim 7, wherein said disc controller further has means for dividing data designated by the write request from the external apparatus, thereby forming a plurality of data blocks, and said deciding means comprises means for deciding the disc unit to hold said produced data block.

10. A disc subsystem according to claim 7, wherein said disc controller further has means for discriminating the disc unit to hold the plurality of data blocks in which the reading operations were requested from the external apparatus, and means for transferring the plurality of read commands for the plurality of data block groups comprising the plurality of data blocks which were determined such that they were held in the mutually same disc unit group to the transfer controller provided in correspondence to said disc unit group through the common bus, in which said transfer means sequentially transfers the plurality of read commands for the different data block groups to the different transfer controllers through the common bus, each of said transfer controllers further has means for transferring in parallel the read commands of the plurality of data blocks constructing the data block group to the plurality of disc units connected to the transfer controller in response to the read command of the data block group supplied from the disc controller through the individual path provided in correspondence in the disc units, each of the disc units further has means for reading out the data block designated by said read command from the disc drive included in said disc unit in response to the read command of the data block which is generated from the transfer controller to which said disc unit is connected and for storing the read-out data block into the buffer in said disc unit, and means for transferring said read-out data block to the transfer controller via the individual bus connected to the disc unit, each of the transfer controllers further has means for transferring the data block group consisting of the plurality of data blocks transferred from the plurality of disc units connected to said transfer controller to the disc controller through the common bus, and said disc controller further has means for concatenating the plurality of data block groups transferred from said plurality of transfer controllers and for transferring to the external apparatus as read data.

11. A disc subsystem according to claim 10, wherein said disc controller further has means for discriminating the plurality of data blocks constructing data to be read but on the basis of information to specify data which was designated by said external apparatus and should be read out, and said means for discriminating the disc unit to hold the data block to be read out comprises means for discriminating the disc unit in which said plurality of data blocks discriminated by said means for discriminating the plurality of data blocks are held.

12. A disc subsystem comprising:

a disc controller;

a plurality of disc units which are classified into a plurality of disc unit groups each consisting of a plurality of disc units; and a plurality of common buses each of which is provided in correspondence to each of said disc unit groups and is used to connect the plurality of disc units belonging to the corresponding disc unit group to said disc controller, wherein said disc controller has means for deciding the disc unit to which the plurality of data blocks whose writing operations were requested from an external memory device should be written, wherein said disc controller includes means for translating, by using a table, a logical address designated by said external memory device into a physical address in said disc unit in which the data block is written, means for determining data block groups in which each data block group comprises data blocks to be written into different disc units belonging to the same disc unit group, and means for sequentially transferring the data blocks in a data block group to be written into a disc unit group through the common bus provided in correspondence to said disc unit group, whereby said transfer means transfers the different data block groups in parallel through the different common buses, and each of the disc units has a disc drive to hold at least one data, a buffer, and control means for writing one of the data blocks transferred to the disc unit through the common bus provided for the disc unit group to which said disc unit belongs into the buffer and for transferring said written data block from the buffer to said disc drive in a manner such that a next data block which belongs to the block group is transferred to another disc unit in parallel with the writing of said one data block to the disc drive.

13. A disc subsystem according to claim 12, wherein said transfer means has means for transferring a preceding of the data blocks belonging to each data block group to one of the disc units and, thereafter, for transferring the plurality of data blocks belonging to each of the data block groups in a manner such that the next data block which belongs to said data block group and is subsequent to said preceding data block is transferred to another disc unit in parallel with a writing of the preceding data block from said one disc unit into the disc drive.

14. A disc subsystem according to claim 13, wherein said disc controller further has means for dividing data designated by the write request from said external apparatus, thereby forming a plurality of data blocks, and said deciding means comprises means for deciding the disc device to hold said data block formed.

15. A disc subsystem according to claim 12, wherein said disc controller further has means for discriminating the plurality of disc units in which the plurality of data blocks whose reading operations were requested from said external memory device are held, means for transferring a plurality of read commands to said plurality of disc units in order to read out the data blocks, and means for sequentially transferring the read commands of said plurality of data blocks which were determined such that they were held in the plurality of disc units mutually belonging to the same disc unit group to said plurality of disc units through the common bus provided in correspondence to said disc unit group, in which said transfer means transfers a plurality of the other read commands for the other disc unit groups in parallel with said plurality of read commands, each of said disc units further has means for reading out the data block designated by the read command from the disc drive in the disc unit in response to the read command supplied from the disc controller and for storing said read-out data block into the buffer in said disc unit, and means for transferring the read-out data block to said disc controller through the common bus connected to said disc unit, and said disc controller further has means for concatenating the plurality of data blocks transferred from said plurality of disc units, thereby forming read data.

16. A disc subsystem according to claim 15, wherein said disc controller further has means for discriminating the plurality of data blocks constructing the data to be read out on the basis of information to specify the data which was designated by said external apparatus and should be read out, and said means for discriminating the disc unit to hold the data block to be read out comprises means for discriminating the disc unit in which said plurality of data blocks discriminated by said means for discriminating the plurality of data blocks are held.

* * * * *